United States Patent
Chertok

(10) Patent No.: US 7,200,994 B2
(45) Date of Patent: Apr. 10, 2007

(54) FREE PISTON STIRLING ENGINE CONTROL

(75) Inventor: Allan Chertok, Bedford, MA (US)

(73) Assignee: Tiax LLC, Cambridge, MA (US)

(*) Notice: Subject to any disclaimer, the term of this patent is extended or adjusted under 35 U.S.C. 154(b) by 0 days.

(21) Appl. No.: 10/883,393

(22) Filed: Jul. 1, 2004

(65) Prior Publication Data

US 2005/0028520 A1 Feb. 10, 2005

Related U.S. Application Data

(60) Provisional application No. 60/484,392, filed on Jul. 2, 2003.

(51) Int. Cl.
*F01B 29/10* (2006.01)
(52) U.S. Cl. ............................ 60/518; 60/520
(58) Field of Classification Search .............. 60/517, 60/518, 520
See application file for complete search history.

(56) References Cited

U.S. PATENT DOCUMENTS

| | | | |
|---|---|---|---|
| 4,397,155 A | 8/1983 | Davey | 62/6 |
| 4,434,617 A | 3/1984 | Walsh | 60/250 |
| 4,454,426 A | 6/1984 | Benson | 290/1 R |
| 4,481,459 A | 11/1984 | Mehl et al. | 322/10 |
| 4,511,805 A | 4/1985 | Boy-Marcotte et al. | 290/2 |
| 4,567,726 A * | 2/1986 | Vitale et al. | 60/520 |
| 4,642,547 A | 2/1987 | Redlich | 322/3 |
| 4,745,749 A | 5/1988 | Benson | 60/518 |
| 4,805,408 A | 2/1989 | Beale et al. | 60/520 |
| 4,811,563 A | 3/1989 | Furuishi et al. | 60/517 |
| 4,873,826 A | 10/1989 | Dhar | 60/641.14 |
| 4,948,209 A | 8/1990 | Baker et al. | 322/10 |
| 5,002,020 A | 3/1991 | Kos | 123/46 E |
| 5,013,929 A | 5/1991 | Dhyanchand | 290/31 |
| 5,018,357 A * | 5/1991 | Livingstone et al. | 62/6 |
| 5,079,924 A | 1/1992 | van der Broeck et al. | 62/6 |
| 5,095,701 A | 3/1992 | Nakano | 60/521 |

(Continued)

FOREIGN PATENT DOCUMENTS

DE 39 34 221 4/1991

(Continued)

OTHER PUBLICATIONS

Griffin—22nd IECEC New York 1987 (AIAA)—Abstract.

(Continued)

*Primary Examiner*—Hoang Nguyen
(74) *Attorney, Agent, or Firm*—Lowrie, Lando & Anastasi, LLP

(57) ABSTRACT

A control system for a Stirling engine including the use of a synchronous power converter ("SPC") which is connected to the terminals of the alternator in a linear alternator/FPSE power system. According to the teachings of the present invention, the attached SPC is small and portable and further ensures that piston and displacer excursion within the system remain within design limits. The system and method are designed such that it is possible to adjust both the voltage amplitude and the waveform frequency at the terminals of the linear alternator. By controlling these operational aspects, both the speed and the range of travel associated with the piston and the displacer in the FPSE can be controlled.

39 Claims, 6 Drawing Sheets

U.S. PATENT DOCUMENTS

| | | | |
|---|---|---|---|
| 5,174,116 A | 12/1992 | Ishikawa | 60/520 |
| 5,174,117 A | 12/1992 | Naito et al. | 60/520 |
| 5,228,293 A | 7/1993 | Vitale | 60/641.14 |
| 5,342,176 A | 8/1994 | Redlich | 417/212 |
| 5,615,556 A | 4/1997 | Honda et al. | 62/6 |
| 5,813,235 A | 9/1998 | Peterson | 62/6 |
| 5,850,111 A | 12/1998 | Haaland | 310/15 |
| 5,864,770 A | 1/1999 | Ziph et al. | 701/110 |
| 5,987,886 A | 11/1999 | Sekiya et al. | 60/523 |
| 6,050,092 A | 4/2000 | Gentsler et al. | 60/520 |
| 6,074,172 A | 6/2000 | Huang | 417/214 |
| 6,094,912 A | 8/2000 | Williford | 60/520 |
| 6,181,110 B1 | 1/2001 | Lampis | 322/3 |
| 6,199,381 B1 | 3/2001 | Unger et al. | 60/520 |
| 6,274,941 B1 | 8/2001 | Rhyiner | 290/40 A |
| 6,279,319 B1 | 8/2001 | Conrad | 60/520 |
| 6,507,126 B1 | 1/2003 | Laqua et al. | 290/40 |
| 6,536,326 B2 | 3/2003 | Unger et al. | 91/361 |
| 6,809,486 B2 * | 10/2004 | Qiu et al. | 318/135 |
| 6,812,597 B2 * | 11/2004 | McGill et al. | 310/12 |
| 6,856,107 B2 | 2/2005 | Daboussi | 318/135 |
| 2002/0121816 A1 | 9/2002 | Qiu et al. | 310/51 |
| 2003/0173834 A1 | 9/2003 | McGill et al. | 310/12 |

FOREIGN PATENT DOCUMENTS

DE          3934221     *   4/1991

OTHER PUBLICATIONS

Berchowitz—23$^{rd}$ IECEC Denver 1988 (ASME)—Abstract.
Rauch—27$^{th}$ IECEC San Diego CA 1992 (SAE)—Abstract.
Kankam—31$^{st}$ IECEC Washington, D.C. 1996 (IEEE)—Abstract.
De Monte #1—J. Propulsion & Power—Abstract.
De Monte #2—J. Propulsion & Power—Abstract.

* cited by examiner

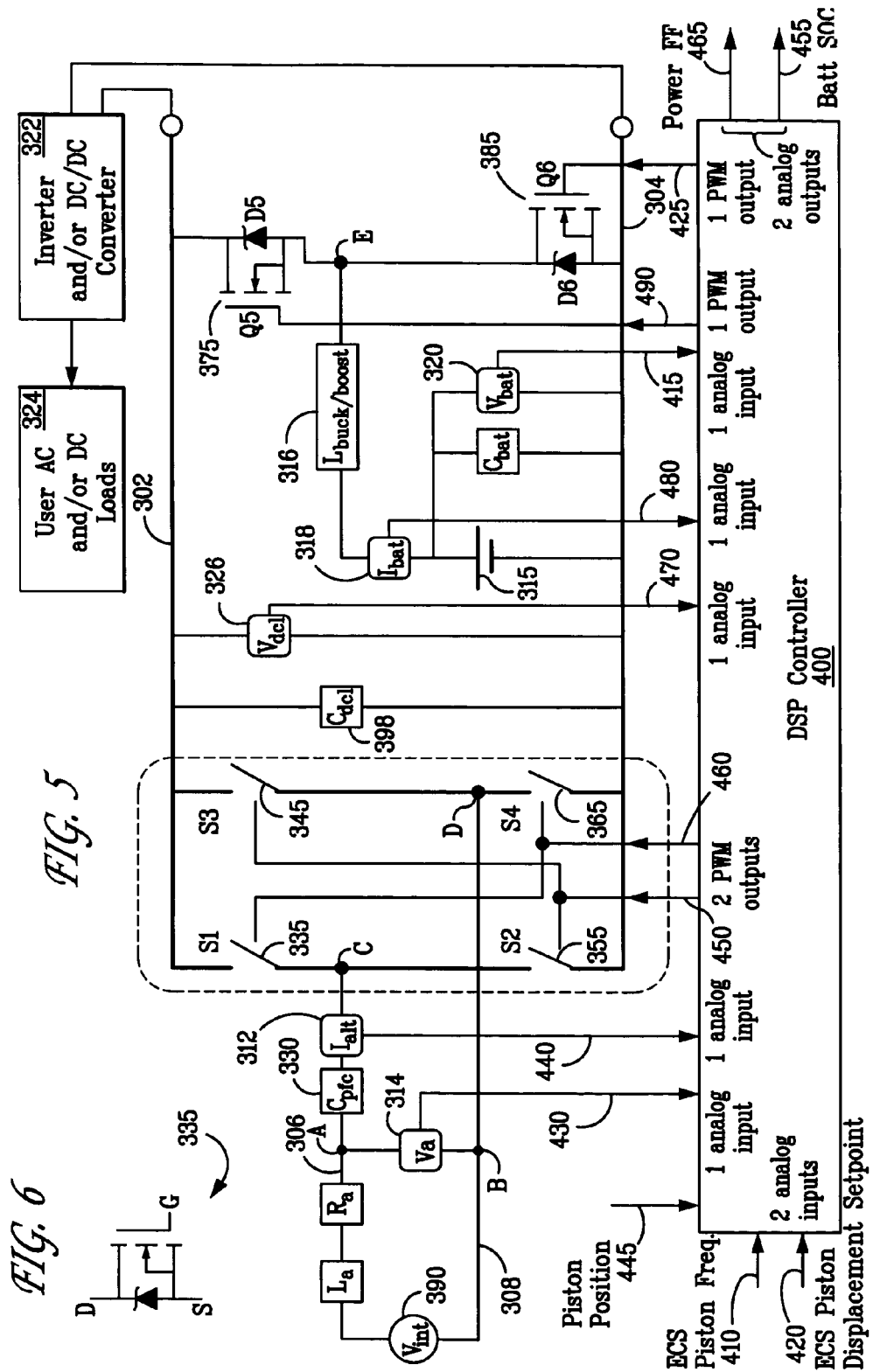

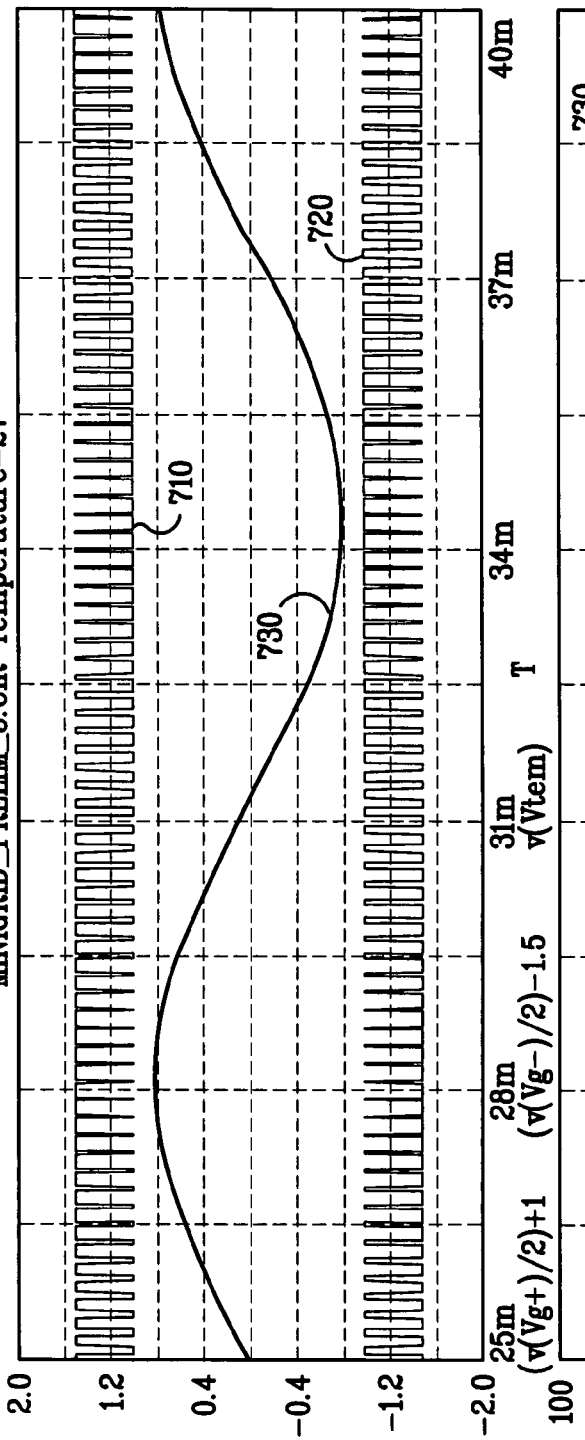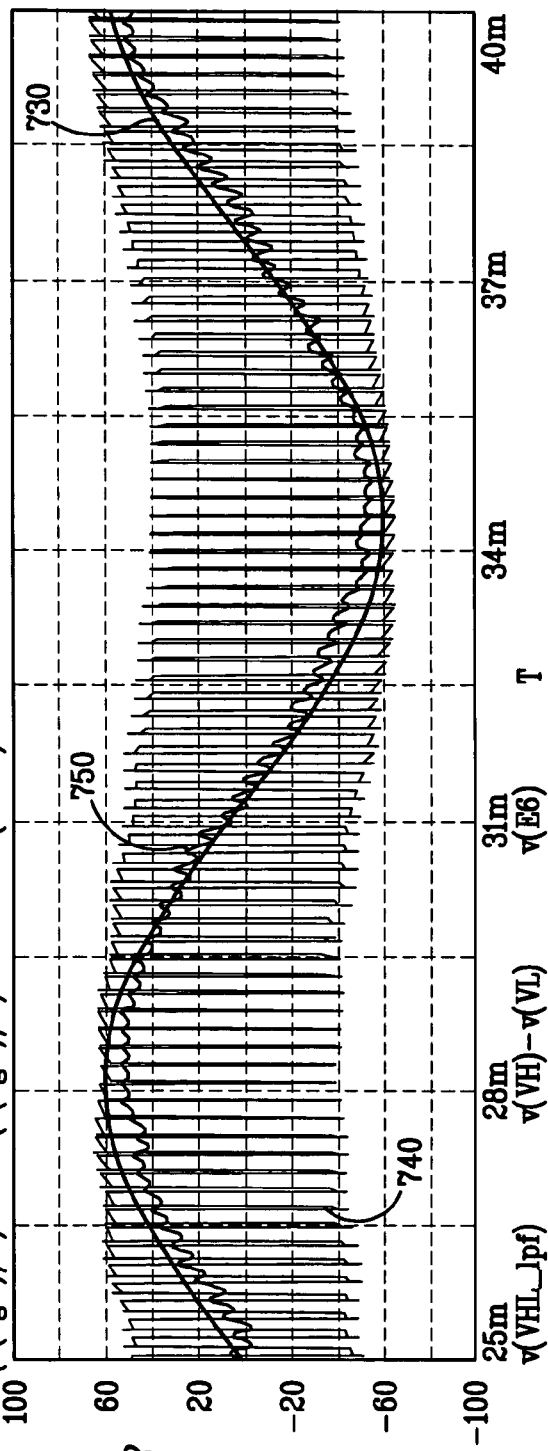
FIG. 7A
FIG. 7B

FREE PISTON STIRLING ENGINE CONTROL

RELATED APPLICATIONS

This patent application claims priority from Provisional Application Ser. No. 60/484,392, filed on Jul. 2, 2003, the contents of which are hereby incorporated by reference.

FIELD

This invention is in the field of electronic controls for free-piston Stirling engines driving linear alternators.

BACKGROUND

A Stirling engine is characterized by having an external heat source as contrasted with an internal combustion engine. The external heat source can come from combustion of fossil fuels, concentrated solar energy, heat from the decay of radioactive isotopes, hot exhaust gasses from diesel engines, or any other source of heat. Early Stirling engines used air as a working fluid, but modern ones use a gas such as Helium at pressures of 30 atmospheres or so.

There are two main methods of transmitting forces from the Stirling power piston to perform useful mechanical work on a load such as an electrical generator. In a so-called "kinematic" design, a power piston is connected to a crankshaft, as in a conventional automobile internal combustion engine, and turns a load such as a rotary electrical generator. In this case, the power piston excursion is constrained to limits established by the piston's rigid mechanical connection to the crankshaft. The second configuration is the so-called "free piston" Stirling engine ("FPSE") wherein a mechanically unconstrained piston moves in simple harmonic motion at a frequency nominally equal to a natural mode determined by piston mass and various restoring spring rates provided by pneumatic, mechanical or other means. Typically FPSE piston displacement is controlled by appropriate dynamic balancing of input heat flux and mechanical loading to avoid excursions beyond design limits which would cause undesired impact with the cylinder ends. In one typical FPSE application, the power piston is connected by a rigid rod to a cylindrical magnetic structure (often called a "mover") which cooperates with the fixed stator portion of a linear electrical alternator. The back and forth movement of the mover/power piston generates an AC voltage at the output of the alternator. In some applications, the FPSE configuration is preferred to its kinematic alternative, one distinct advantage being that the FPSE virtually eliminates piston-cylinder wall normal forces thereby avoiding the need to lubricate these surfaces and provides means to isolate lubricant-intolerant engine components.

A cross sectional view of a generic FPSE/linear alternator (FPSE/LA) combination 10 is illustrated in FIG. 1 with the FPSE portion 50 to the left of the figure and the alternator portion 60 to the right of the figure. A gas-tight case 12 contains a freely moving displacer 14 guided by a fixed displacer rod 16. A movable power piston 18 is connected to a permanent magnet structure 20. Various ring seals (not illustrated) may be used to form a gas tight seal between the displacer 14 and power piston 18 and internal part of the case 12. Alternatively, tight radial clearances may be used to limit leakage flows around the pistons and displacer components.

The mover employs one or more permanent magnet elements which produce a field flux in a fixed core 24 that links with turns of an armature coil 22. Motion of the mover produces a time-varying coil flux linkage and the consequent induction of a so-called "internal voltage". The internal voltage oscillates at the frequency of the mover and with amplitude proportional to the time rate of change of coil flux linkage. When an external load is connected to the armature coil the developed internal voltage will drive current through an external load impedance and is thereby capable of delivering useful electrical power to dissipative load elements. Armature current flow through the external load in turn causes a mover reaction force which must be overcome by the power piston effort. By this means mechanical power delivered to the mover by the power piston is converted to electrical power.

Usually, the four central spaces inside the case are denominated as follows. The space between the displacer 14 and the case 12 is the expansion space 32; the space inside the displacer 14 may serve as a gas spring 34, the space between the displacer and the power piston 18 is the compression space 36; and the space between the power piston 18 and the case 12 is the bounce space 38. The case 12 may be mounted on mechanical springs (not illustrated).

Thermal energy to run the Stirling engine is supplied by a heater 40 on the outside of the case 12 opposite the displacer 14. Any source that can heat the gas in the expansion space 32 is usable. Inside the case 12, surrounding the displacer 14, is a regenerator 42. In one portion of the operating cycle, gas from the expansion space is forced through the inlet space 44 from the expansion space 32 and via the regenerator 42 through the outlet space 46 to the compression space 36. In a second portion of the cycle, gas from the compression space is returned to the expansion space via outlet space 46, regenerator 42 and inlet space 44. A cooler 48 surrounds the case 12 in the vicinity of the outlet space 46. As is well known, to achieve maximum thermodynamic efficiency, the cooler should cool the gas in the outlet space 46 as much as possible.

The operating principles of a Stirling engine are less intuitively obvious than those of a steam or internal combustion engine. U.S. Pat. No. 6,062,023, issued May 16, 2000, to Kerwin et al. for "Cantilevered Crankshaft Stirling Cycle Machine," incorporated herein by reference, describes the four stage thermodynamic cycle of a generic Stirling engine. The Stirling engine was invented by Robert Stirling in 1816 and the basic principles are well known in the art. A brief historical review is contained in U.S. Pat. No. 5,146,750, issued Sep. 15, 1992, to Moscrip for a "Magnetoelectric Resonance Engine," and is incorporated herein by reference.

Unlike kinematic Stirling engines, in the FPSE/LA combination 10 illustrated in FIG. 1, there is nothing to prevent displacer 14 or piston 18 from impacting parts of case 12. Designers have long sought designs that would limit piston and displacer excursion and thus prevent impacts so as to keep the engine running in a stable manner under varied operating conditions. In the case of FPSEs, heat flux input and mechanical piston power extraction (e.g., via a piston driven linear alternator and electrical load) are two controllable factors which may be employed to influence piston and displacer excursion. Unfortunately, heat flux control is not generally useful in controlling these excursions since the control can not be effected quickly enough to address out-of-bounds piston or displacer excursion limitation because, in many applications of these machines, the electrical load on the alternator can undergo very rapid changes.

Various solutions to piston and displacer excursion control under varying piston loading conditions have been utilized. One class of solutions involves maintaining control of piston and displacer excursions via self-controlling mechanisms such as porting arrangements wherein, for example, these excursions are maintained without the need for external load control. Various problems and drawbacks have been associated with these types of solutions including, for example, the fact that ports can clog with materials resulting from normal engine operation such chafing of external component surfaces over time. In addition, these prior art solutions also tend to generate losses, negatively impacting efficiency.

Another class of prior art solutions has been directed to effecting control of the electrical load placed upon the alternator being driven by the piston. In this case, a ballast or auxiliary load is used to maintain a constant load on the alternator despite changes in the external load power demand. Thus, these solutions take advantage of the fact that, for a given heat flow input to the FPSE, piston excursion can be constrained to a specific range as long as the alternator load is caused to remain constant. These solutions represent, however, inefficient techniques for controlling piston amplitudes and possible excursions resulting from load variations.

An example of a solution using constant alternator load control is U.S. Pat. No. 4,873,826, issued Oct. 17, 1989, to Dhar. Dhar discloses the control of engine operation through a connection between the alternator output and a utility grid. While this solution have many advantages, such as the ability to maintain a constant engine load, resulting operational characteristics are generally constrained by the fact that engine operation must match the operational frequency of the power grid. This constraint inhibits attainment of higher FPSE/LA power density which might otherwise be achieved by operation at a frequency higher than that of a 50 or 60 Hz power grid. Further, frequency variation over time cannot be achieved even though it is otherwise beneficial in certain circumstances such as, for example, during engine warm up when a lower pneumatic spring rate favors operation at a frequency lower than the nominal rated value, or during emergency out of range conditions where a rapid drop of enforced operating frequency can near-instantaneously reduce piston and displacer excursions. Finally, in the case of portable applications, it is often not feasible to connect to a power grid as required by Dhar.

Various prior art examples alternatively provide control without connection to a utility grid. Examples of these control systems are disclosed in U.S. Pat. No. 4,642,547, issued Feb. 10, 1987, to Redlich which teaches a control system that provides an adjustable ballast load as well as alternator armature tap connections to maintain constant engine loading as the user load varies. U.S. Pat. No. 6,050,092, issued Apr. 18, 2000, to Gentsler et al. which also controls operation using a variable load member to dynamically adjust load during operation and thereby control piston stroke. The use of alternator ballast loading to maintain constant engine load as practiced by these solutions, is inefficient. Additionally, these methods and the disclosed embodiments do not provide means to enforce variation of engine frequency which, as stated above, is desirable for a number of reasons.

As an alternative to piston stroke control by controlling the electrical load on the alternator output, various mechanical methods have been proposed using controllable valves, springs, and linkages as disclosed in U.S. Pat. No. 5,385,021, issued Jan. 31, 1995, to Beale and U.S. Pat. No. 5,502,968, issued Apr. 2, 1996, also to Beale. While these solutions claim to achieve piston stroke control, they do not exercise control of operating frequency. Additionally, the controllable rate electromagnetic spring element described would necessarily incur winding resistance, hysteretic and eddy current losses all of which compromise the overall efficiency of the power plant.

SUMMARY

One aspect is to provide a control system that maintains FPSE engine operating characteristics within an acceptable range.

Another aspect is to provide a control system that maintains piston excursion within an acceptable range.

Yet another aspect is to provide a control system that maintains displacer excursion within an acceptable range.

Another aspect is to provide a control system that does not require connection to a fixed power grid.

A still further aspect is to provide a control system that permits FPSE portability.

Yet another aspect is to provide a control system that permits real time adjustment of both voltage amplitude and voltage waveform frequency at the alternator terminals in order to control piston and/or displacer excursion within an FPSE.

Another aspect is to provide a methodology for controlling piston and/or displacer excursion in an FPSE.

A still further aspect is to provide a control methodology which employs adjustments to both voltage amplitude and voltage waveform frequency at the alternator terminals in order to control piston and/or displacer excursion within an FPSE.

Another aspect is to provide a methodology for piston and/or displacer control within an FPSE without requiring parts and components which are very large, heavy and expensive.

A preferred form of the control system of the present invention includes various embodiments. One such embodiment involves the use of controllable power electronic apparatus which is connected between the terminals of the alternator in a linear alternator/FPSE power plant and a user electrical load. This apparatus functions as a synchronous power converter ("SPC") such that it can absorb alternator power by transferring it to an electrical load while enforcing the amplitude and frequency of the alternator terminal voltage.

According to the teachings of the present invention, system control is typically achieved with a digital signal processor (DSP) and the power electronic apparatus enables the same advantageous alternator and engine operating conditions attained by connection to a large power grid with the added benefits of near-instantaneous controllability of voltage amplitude and frequency. Moreover, an FPSE/LA system according to the present invention may operate as a standalone power plant not requiring connection to a power grid.

The SPC of the present invention includes an energy storage element, such as a rechargeable battery, to accommodate transient load changes. Additionally, since the SPC is bi-directional, the storage element may be used to briefly deliver power to the alternator so that it may operate as a motor in order to assist in the starting operation of the FPSE.

According to the teachings of the present invention, the SPC is a controllable power electronic unit embedded in an FPSE/LA portable or fixed power plant which ensures that piston and displacer excursion within the system remain within design limits. This is generally accomplished through a system and methodology which is capable of adjusting both the voltage amplitude and the waveform frequency at the terminals of the linear alternator. By controlling these operational aspects, both the speed and the range of travel associated with the piston and the displacer in the FPSE can be controlled.

In one embodiment, the system of the present invention permits both the sourcing and the sinking of electrical energy with respect to the SPC which is attached to the terminals of the linear alternator. Under some operational characteristics, the SPC acts in a motor drive capacity where it supplies power from a battery or other energy store to the alternator to operate it as a starting motor and under other operational characteristics the SPC absorbs power and delivers it to a user load or stores it in a storage device such as a battery.

The present invention further comprises a methodology for controlling the operation of an FPSE/LA system and in particular controlling the excursion of the piston and the displacer during operation. The methodology calls for attaching the aforementioned SPC between the terminals of the alternator and those of an electrical load and controlling the voltage waveforms at the terminals both with respect to voltage amplitude and with respect to frequency. By asserting these controls on the alternator, engine operation can be controlled such that piston and displacer excursion can be maintained within limits dictated by system design.

Other embodiments of the present invention are also possible as described in further detail below and as will be understood by one of skill in the art.

BRIEF DESCRIPTION OF THE DRAWINGS

The invention will now be described in more detail with reference to preferred forms of the invention, given only by way of example, and with reference to the accompanying drawings, in which:

FIG. 5 is a circuit diagram more particularly illustrating the control and power system circuitry according to the FIG. 4 embodiment of the present invention;

FIG. 6 is an illustration of a MOSFET device which forms the switch in the circuit diagram of FIG. 5; and FIGS. 7(a) and 7(b) are graphs including a set of waveforms illustrating the PWM timing according to an embodiment of the present invention.

DETAILED DESCRIPTION OF THE PREFERRED EMBODIMENTS

Reference is now made to the embodiments illustrated in FIGS. 1–7 wherein like numerals are used to designate like parts throughout.

According to the teachings of the present invention, an "SPC" is connected between the terminals of an alternator of an FPSE/LA power system and an electrical load. The alternator of the FPSE/LA power system to which the teachings of the invention may be applied may be any linear alternator including, for example, the linear alternator depicted in FIG. 1. Other configurations and types of linear alternators may also be used. By using the SPC to control voltage amplitude and waveform frequency at the alternator terminals, FPSE piston displacement can be controlled to within a desired operating range. For the purposes of this disclosure and as will be readily understood by one of skill in the art, only piston excursion is discussed. In the context of FPSEs, by controlling piston excursion, displacer excursion can be similarly controlled as a result of the cross-coupled operating characteristics of these FPSE elements. While the discussion is, as mentioned, limited to piston control, it will be readily understood by one of skill in the art, that the teachings of the present invention can be readily adapted to directly control displacer excursion within a confined range.

Figure 1:
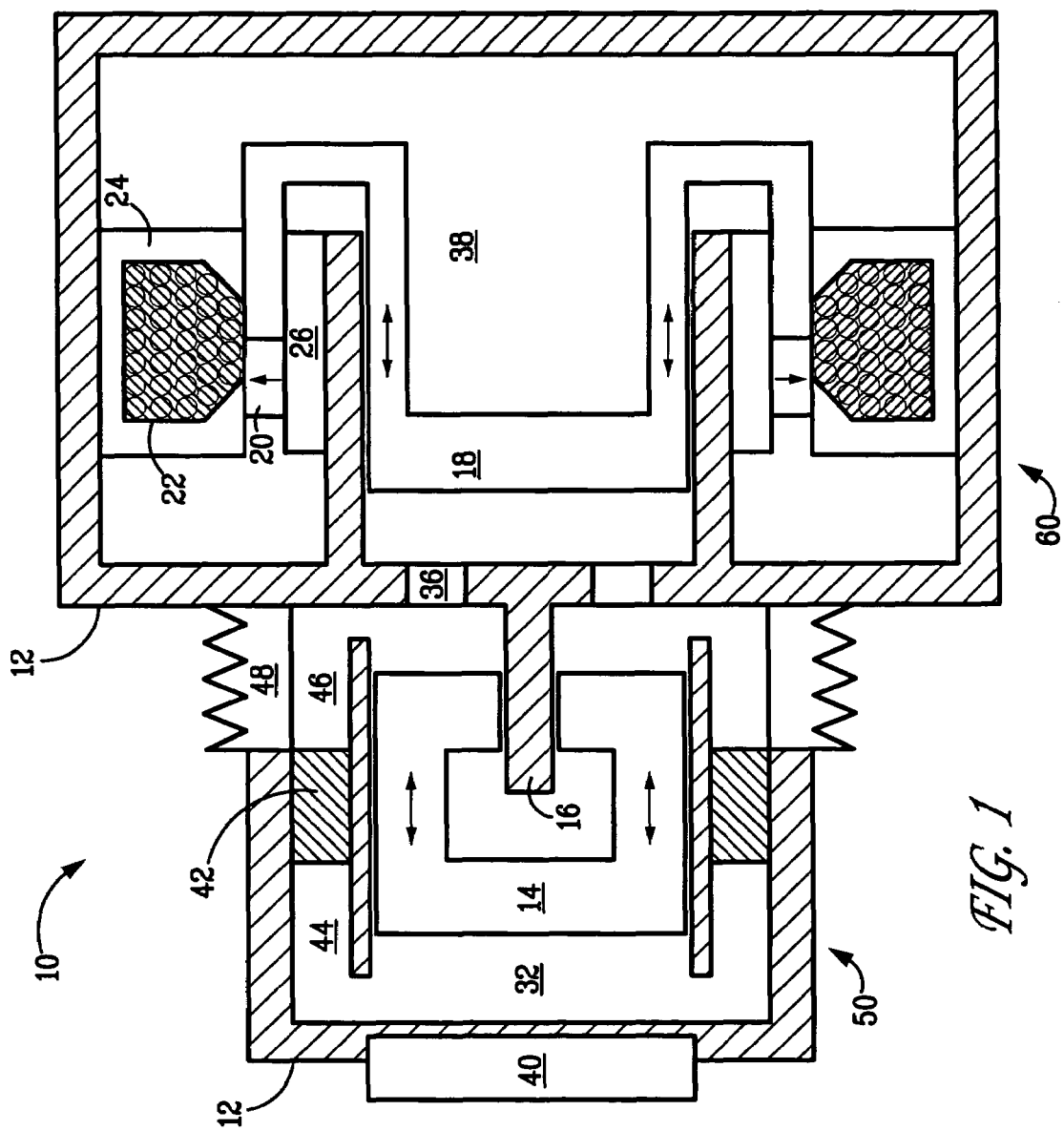
FIG. 1 illustrates the basic structure of a FPSE/LA system as is known in the art.
Figure 2:
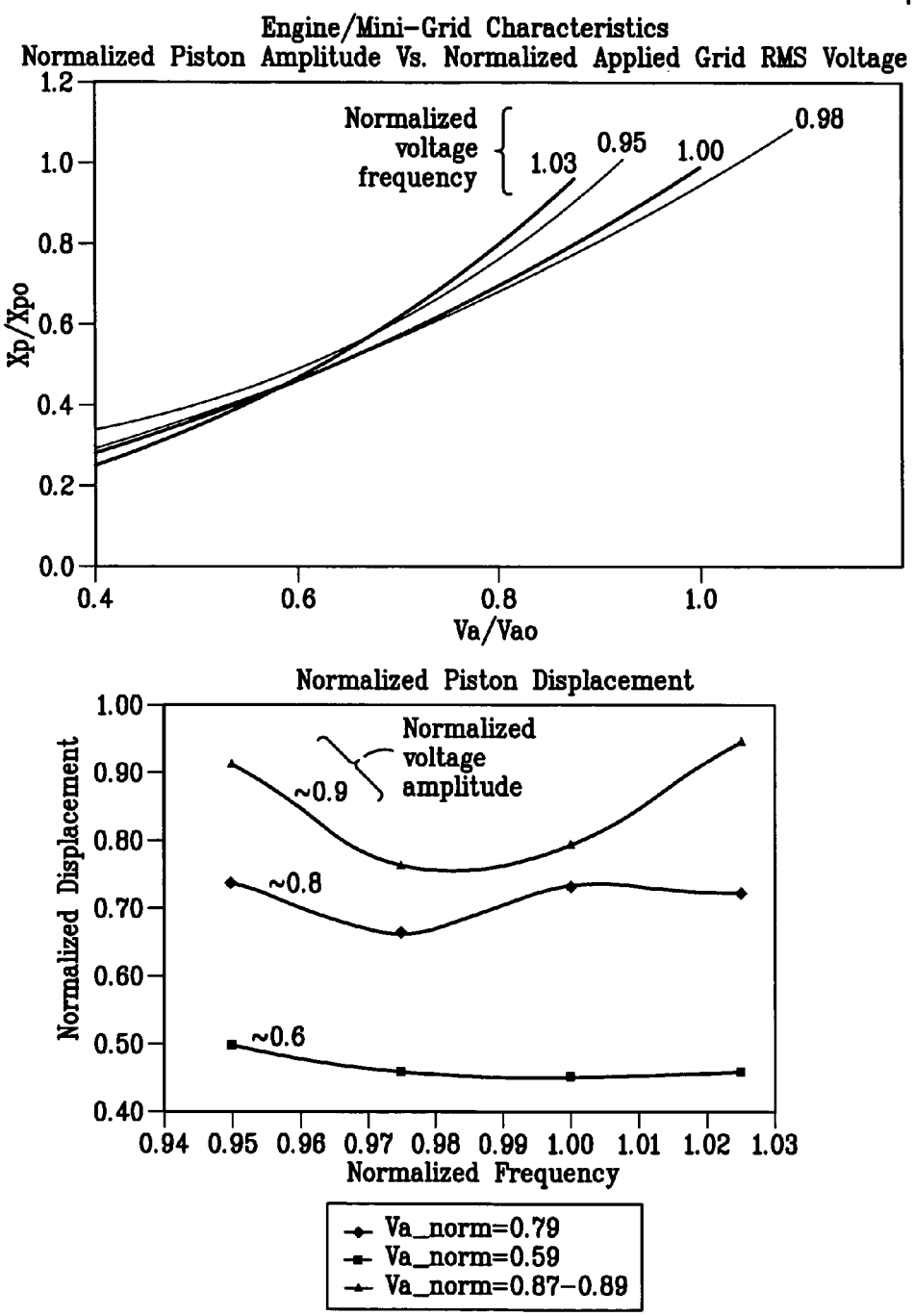
FIG. 2 is a set of graphs demonstrating the control of piston displacement through the enforcement on alternator terminal voltage amplitude and frequency according to the teachings of the present invention.

Prior to describing the system and methodology of the present invention, a brief discussion of the characteristics of piston control via enforcement of alternator terminal voltage amplitude and frequency is provided in connection with FIG. 2. As will be recognized by one of skill in the art, the graphs in FIG. 2 demonstrate that piston displacement $x_p$ can be controlled by enforcing alternator terminal voltage amplitude $V_a$. In addition, FIG. 2 further illustrates that piston displacement $x_p$ is also very responsive to the control of voltage frequency as normalized voltage magnitude $V_a$ approaches 1.0 per unit (pu).

The top graph of FIG. 2 illustrates various curves demonstrating the relationship between piston displacement and alternator terminal voltage amplitude at a number of normalized voltage frequencies while the bottom graph of FIG. 2 illustrates various curves demonstrating the relationship between piston displacement and alternator terminal voltage frequency at a number of normalized voltage amplitudes. These curves were generated by modeling FPSE/LA behavior using numerical analysis techniques via tools such as MathCAD and MicroCAP SPICE. These tools can be and have been used to predict the dynamic performance of an FPSE/LA system under specific operating conditions. In particular, the solution of the applicable equations and the results displayed in FIG. 2 were obtained using the MathCAD 2001i general purpose computational tool available from MathSoft.

It should be noted that the "isothermal model" inherent in the analysis is based upon the simplifying assumption that various engine volumes operate at fixed temperatures. Estimates of relevant parameters such as piston displacement and alternator output power provided by the model are in general agreement with prototype results and, as such, are viewed as sufficiently accurate models for the purpose of demonstrating the characteristics associated with the system and methodology of the present invention.

Referring first to the graph on the top of FIG. 2, it can be seen that at all tested voltage frequencies (normalized frequencies of 0.95, 0.98, 1.00 and 1.03), there is a near linear relationship between normalized piston amplitude and normalized applied alternator terminal voltage amplitude. As a result of this relationship, and using the control techniques discussed herein, piston displacement can be controlled by dictating voltage amplitude at the alternator terminals using the SPC as required by the particular operating environment.

Similarly, the graph on the bottom of FIG. 2 demonstrates that at the tested voltage amplitudes (normalized voltages of 0.6, 0.8, and approximately 0.9), normalized piston displacement becomes controllably responsive to frequency changes as normalized voltage amplitude approaches 1.0. Given this relationship and by applying such a voltage amplitude, it can be seen that enforcement of alternator terminal voltage frequency can also be effective to stabilize or control piston displacement.

Figure 3:
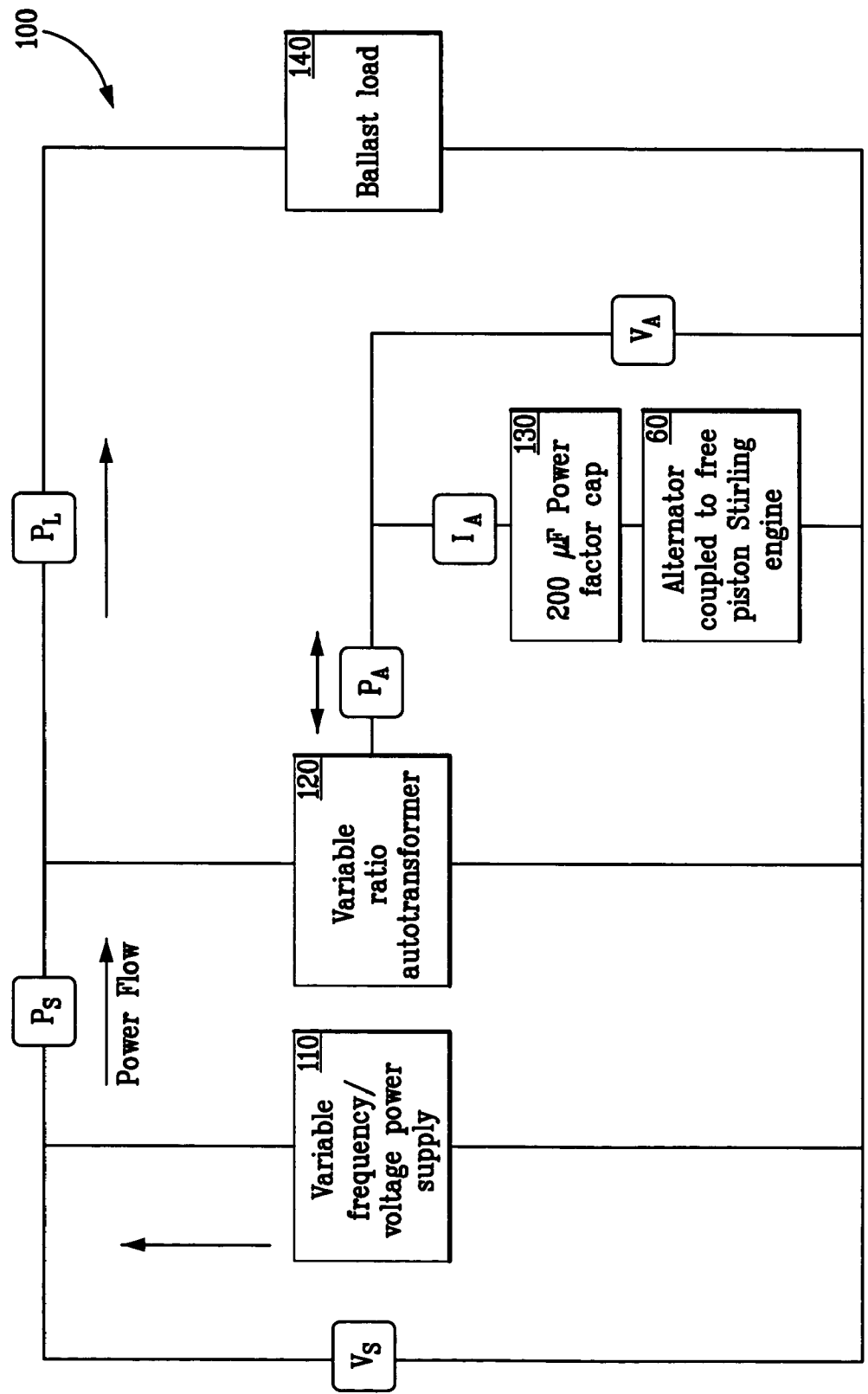
FIG. 3 is a block diagram illustrating the control and power system of the present invention according to one embodiment thereof.

Referring now to FIG. 3, a block diagram of the SPC component 100, as connected to the linear alternator 60 of the FPSE/LA system according to the teachings of the present invention, is depicted. The embodiment shown in FIG. 3 and described in connection therewith represents an exemplary embodiment which is not particularly suited for product deployment but is rather primarily used in a laboratory environment for testing purposes. This is primarily because no storage device is present in this embodiment of the present invention and a grid powered laboratory apparatus is used to simulate operation of the SPC.

As will be understood by one of skill in the art, the circuitry and components of SPC 100 may be contained within a box or other enclosure. Preferably, external terminal connections are available on the enclosure to permit easy connection and disconnection of the terminals of alternator 60 to and from SPC 100.

As alluded to above and as will be discussed in further detail below, SPC 100 is designed to function in both a motor (power source) mode and in a generator (power absorber) mode. In addition, SPC 100 provides both a power source and a control function which collectively serve to maintain stable engine operation particularly with respect to limiting piston excursion.

While in motor mode, SPC 100 supplies power to the FPSE/LA system. In this embodiment, since no storage device is present, motor mode power is provided by variable frequency/amplitude power supply 110. This mode may be typically used to start the FPSE and may also promote engine stability during transient loading events. While the present embodiment does not include a storage device, in a deployable system, the storage device within SPC 100 is preferably a battery although other components capable of storing electrical energy may be used. Examples include, without limitation, a flywheel device, an ultra-capacitor or any other device capable of absorbing and, optionally, supplying electrical energy as required.

Alternatively, when in generator mode, which is the typical operating condition of SPC 100, alternator 60 supplies electrical energy to SPC 100 which delivers energy to a connected user load and/or stores energy in the aforementioned storage device. The transition from motor mode to generator mode, for example, during startup, occurs at the point where the engine begins driving the piston as opposed to the piston driving the engine. At this point, current begins to flow into SPC 100, in phase relationship to the terminal voltage corresponding to power delivery by the alternator 60, as opposed to current flow out of SPC 100 and into alternator 60. The change in current flow direction results from the fact that at the point of mode change, the internal voltage developed by alternator 60 as a result of engine operation exceeds the sum of the alternator internal impedance drop and the terminal voltage maintained by SPC 100.

As will be understood by one of skill in the art, in order for the internal alternator voltage to get to the point where current flows into SPC 100, piston 18 and the coupled alternator mover must attain a peak linear velocity equal to the product of radian frequency and peak displacement which will induce an internal voltage sufficient to overcome both the internal impedance of the alternator armature coil 22 and the potential at the alternator armature coil terminals. Since piston 18 velocity and developed internal voltage of alternator 60 are nominally proportional, by controlling the voltage at the terminals of alternator 60 at a particular frequency, the movement of piston 18 both in terms of velocity and excursion can be controlled according to the teachings presented herein.

For example, if from a given stable operating point, the SPC enforced alternator terminal voltage amplitude is incrementally increased, the difference between this voltage and the internal voltage amplitude will momentarily be reduced. As a consequence, the alternator current and the mover reaction force due to this current will also be reduced. With a smaller mover reaction force exerted on the power piston, the oscillating engine pressure wave will meet less resistance and tend to increase the piston and mover displacement and consequently increase the developed internal voltage. Hence, it will be understood that an enforced increase of alternator terminal voltage will result in an increased piston excursion. By similar reasoning, it will be understood that an incremental decrease of the alternator terminal voltage amplitude will result in a decrease of piston excursion.

It is important to note that enforcement of the alternator terminal voltage frequency and amplitude by the SPC causes the FPSE/LA system to synchronize with the SPC in much the same fashion as a conventional engine-driven synchronous generator will synchronize with a larger power system such as a national power grid. Synchronization of the FPSE/LA is readily achieved by initially operating the alternator as a motor driving the FPSE. When engine temperature is sufficient to produce a piston driving oscillating pressure wave of sufficient amplitude to overcome internal system losses, the alternator motor mode current will diminish to zero and then build up in the alternator direction without loss of synchronism with the SPC enforced voltage. If the FPSE working fluid (gas) is already at operating temperature when the SPC is connected to the alternator terminals, only a brief transient motor-mode current flows to initiate engine oscillation and generator mode operation ensues immediately thereafter.

Returning to the specific embodiment as illustrated by FIG. 3, SPC 100 includes a number of functional components. Power supply 110 provides single phase AC power of controllable frequency and amplitude. In this embodiment, power supply 110 cannot absorb power generated by the FPSE/LA. To simulate this capability for purposes of laboratory testing, ballast load 140 is connected in parallel with the output of power supply 110. Power supply 110 maintains a constant voltage across ballast load 140 and hence the power delivered to this load is held fixed, for example, at a value of 1,000 W. As may be seen in FIG. 3, the input of a variable ratio autotransformer 120 is also connected across the output of power supply 110 and the adjustable voltage at the output tap of this transformer enforces the voltage at the terminals of the alternator 60 and a series connected power factor correction capacitor 130. When the alternator receives power (e.g., for purposes of engine starting) (e.g., 100 W), the total power provided by power supply 110 is the sum of the power supplied to ballast load 140 and that to the alternator serving as a motor and hence increases from 1,000 to 1,100 W. When the alternator, driven by the FPSE, produces power, e.g., 500 W, it flows to ballast load 140 and consequently the burden on power supply 110 is reduced by this amount from 1,000 to 500 W.

In this way, the power supplied to ballast 140 remains constant regardless of whether alternator 60 is sourcing or demanding power. Based upon the above, it is preferred that ballast 140 be designed to handle a power maximum that is marginally higher than the maximum power output of the engine. Hence it will be understood that the combination of the power supply and ballast load serve to simulate the power sourcing/sinking functionality of a deployable embodiment of the SPC.

According to the teachings of the present invention, power supply 110 is operated so as to maintain a constant level of power into ballast load 140. This is accomplished by maintaining a constant voltage amplitude at the terminals of the ballast load 140. Ballast load 140 in this embodiment may be, for example, a large resistive network which is known in the art and which is adjustable to different levels of resistance depending upon energy absorption requirements at a particular time.

Referring now again to FIG. 3, the components of SPC 100 and their relationship to each other in one preferred embodiment of the present invention will now be discussed. As discussed above, the function of SPC 100 is to provide a system which can absorb or supply power from or to alternator 60 as required while at the same time enforcing a prescribed terminal voltage amplitude and frequency at alternator 60 depending upon engine operating conditions. Power supply 110 is arranged to supply a constant voltage $V_s$ across ballast load 140. This generates an average supply power $P_s$ which is supplied to ballast load 140 as $P_L$. Power supply 110 is also selected to supply adjustable voltage amplitudes at adjustable frequencies as further discussed herein. Power supply 110 is configured to operate unidirectionally and may supply power either to ballast 140 or alternator 60 but power supply 110 cannot sink power.

Variable ratio autotransformer 120 is located in parallel with both ballast load 140 and power supply 110. Variable ratio autotransformer 120 permits the adjustment of alternator terminal voltage amplitude while maintaining a constant voltage amplitude across ballast 140. Variable ratio autotransformer 120 may be manually or automatically adjusted during operation to control voltage amplitude at the terminals of alternator 60 while the ballast load voltage remains constant. An alternator input/output power $P_A$ is received or delivered by variable ratio autotransformer 120 with power flowing into the autotransformer 120 during normal operation and out of autotransformer 120 at specific times such as during startup.

Alternator input/output power $P_A$ results in current $I_A$ flowing into or out of alternator 60 and voltage $V_A$ across the terminals of alternator 60. In a preferred embodiment, power factor capacitor 130, having an illustrative value on the order of 200 to 500 μF, may be placed between variable ratio autotransformer 120 and alternator 60 to compensate for the internal inductive reactance of alternator 60.

Using the SPC system model as described above, piston stroke can be controlled by varying either or both of the voltage amplitude or the frequency of the voltage waveform appearing at the terminals of alternator 60. While voltage amplitude control with frequency enforced at a fixed value is generally the most effective means for controlling piston stroke, frequency based control may also be used and may have particular benefit in restoring in-range engine operating characteristics when the normal piston excursion limit has been violated or another atypical condition exists. For example, during startup, gas temperature and resulting gas pressure are relatively low. As a result, the spring rate achieved by pneumatic effect on the piston is also lower. The present invention may be employed to allow the engine to operate at such a lower frequency during startup and gradually increase operating frequency as the engine warms up.

Now that a general overview of the system and methodology of the present invention has been provided in connection with an exemplary laboratory embodiment of the present invention, the following discussion concerning a more readily deployable embodiment, based upon the teachings of the present invention, is provided.

Figure 4:
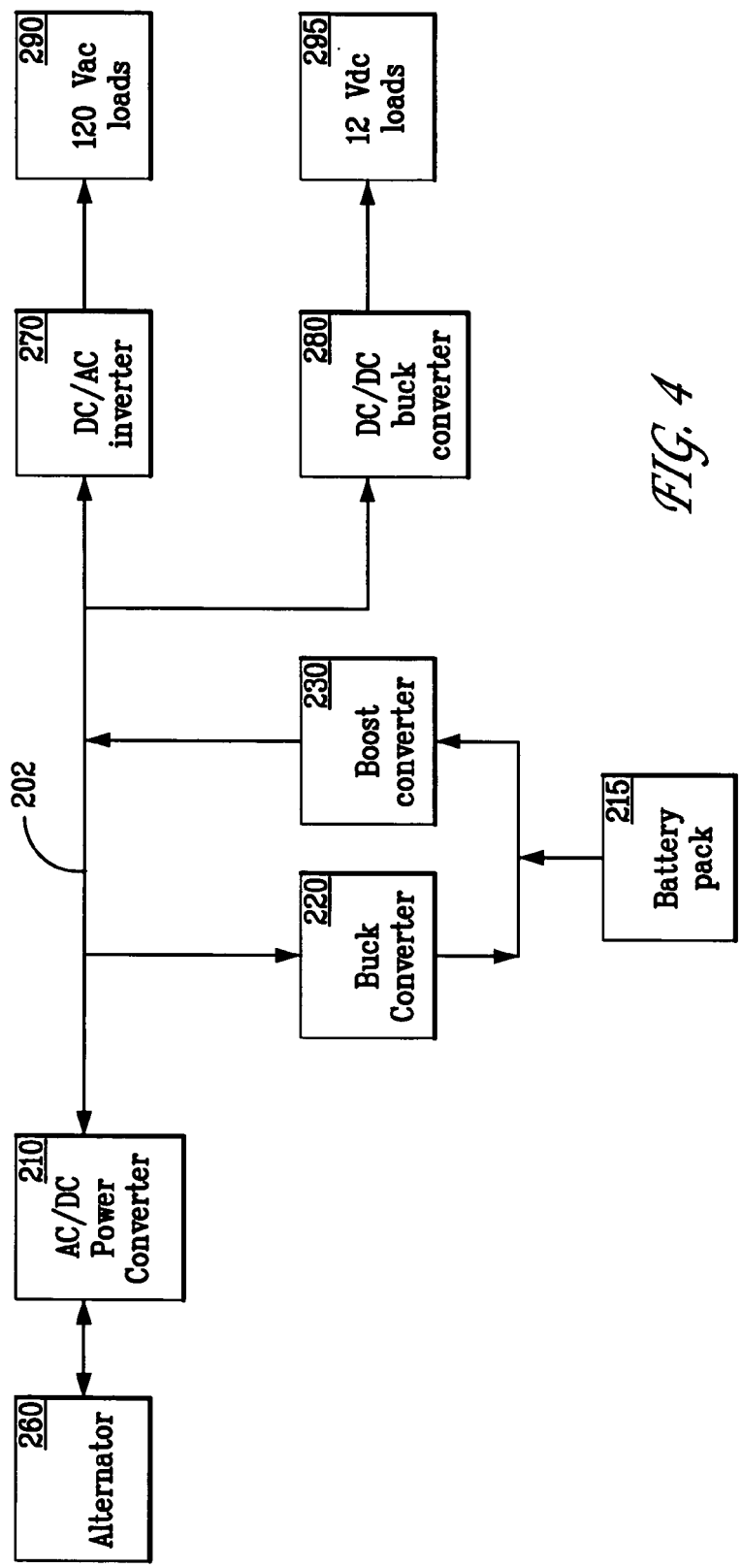
FIG. 4 is a block diagram illustrating the control and power system of the present invention according to another embodiment thereof.

Turning now to FIG. 4, a block diagram of the primary components of the system of the present invention according to a preferred embodiment thereof, is presented. Starting from the left of the figure, alternator 260 is electrically connected via alternator terminals to bidirectional AC/DC power converter 210. As described above, current can flow, as controlled by AC/DC power converter 210 either into alternator 260 or out of alternator 260. As will be discussed in further detail below, AC/DC power converter 210 is comprised of a number of components. For example, AC/DC power converter 210 in a preferred embodiment includes a set of four switches arranged in an "H-bridge" topology for selectively connecting the terminals of alternator 260 to DC link 202 in pulse width modulation fashion such as to produce an effective sinusoidal voltage at the alternator terminals which is controllable in frequency and amplitude. In addition, AC/DC power converter 210 includes a DC link capacitor which is connected between the terminals of DC link 202.

AC/DC power converter 210 further includes a number of sensors for sensing current and voltage such as a voltage sensor for sensing the voltage across the terminals of DC link 202, a current sensor for sensing the current flowing into or out of alternator 260 and a voltage sensor for sensing the voltage across the terminals of alternator 260. AC/DC power converter 210 also includes a control processor, preferably implemented as a digital signal processor (DSP) integrated circuit for controlling the overall operation of AC/DC power converter 210. More detail regarding the components and operation of AC/DC power converter 210 are provided below in connection with FIG. 5.

Also included in the system of the present invention according to a preferred embodiment thereof are buck converter 220 and boost converter 230 which are used for charging and discharging battery pack 215, respectively. Buck converter 220 includes a buck/boost inductor component (shared by both converters 220 and 230) as well as a pair of MOSFETs (shared by both converters 220 and 230). When battery pack 215 is charging, one of the MOSFETs is switched in pulse width modulation fashion and the other is not. The non-switched MOSFET provides an intrinsic diode function. During discharge of battery pack 215 as controlled by boost converter 230, the opposite is true. In this case, the switched and non-switched MOSFETs are reversed as is the MOSFET that provides the intrinsic diode function. Further details on the charging and discharging functions via buck converter 220 and boost converter 230 are provided below.

Yet another possible aspect of the system of the present invention as illustrated by the block diagram of FIG. 4 is DC/AC inverter 270 which converts DC power drawn from DC link 202 to fixed frequency (e.g., 50, 60 or 400 Hz) AC power for use by AC loads 290 operating at a standard voltage (e.g., 120 Vrms, 60 Hz). Inverter 270 may be controlled to be selectively operative based upon a sufficient battery state of charge level. In this manner, connection to a user connected AC load may be selectively deferred until battery pack 215 or another storage device has a charge level meeting a predetermined threshold. Similarly, when powering DC loads such as in automotive 12 VDC applications, DC/DC buck converter 280 can be used to step down and regulate the output DC voltage as required. For example, the voltage on DC link 202 may be on the order of 100 VDC or 200 VDC or higher and can be stepped down to 12VDC via DC/DC buck converter 280 as required.

Now that a general overview of the components of the present invention according to a preferred embodiment has been provided, a more detailed description of the particular circuit and related functionality now follows. According to the embodiment discussed generally in connection with FIG. 4 and now more particularly in connection with FIG. 5, the essential features of the circuit discussed in connection with FIG. 3 are used but additional components are added including a storage component and automatic control of the power electronics function. In connection with this embodiment, alternator terminal 306 is alternately connected, by the switching bridge constituted by switching devices 335, 345, 355 and 365, at system frequency $f_s$, first to DC link positive terminal 302 and then to DC link negative terminal 304 with controllable connection duty cycle. At the same time, and in synchronism with the switching of alternator terminal 306, alternator terminal 308 is alternately connected first to DC link negative terminal 304 and then to DC link positive terminal 302. DC link terminals 302 and 304 form the DC inputs to an inverter though which DC power supplied by DC link 202 is converted to AC power at a standard, fixed load operating frequency, e.g., 50, 60 or 400 Hz and standard voltage, e.g., 120 Vrms or to a stepped down DC voltage via an inverter or DC/DC converter 322. Inverter and/or DC/DC converter 322 may be controlled by DSP 400 (discussed below) as required. The inverter and/or DC/DC converter 322 is connected directly to one or more user AC and/or DC loads 324.

FIG. 5 is an illustration of a single alternator as connected to SPC of the present invention. Although not shown, the system could be alternatively constructed such that more than one alternator could be controlled by a single SPC as illustrated in FIG. 5. In this case, each of such alternators would be connected in parallel to the terminals 302 and 304 of DC link in the same way as illustrated for one alternator in FIG. 5. Yet another alternative is for multiple alternators to be wired in series to a single switching bridge, as such bridge is described below. Alternatively a single switching bridge could be associated with each alternator, all of which bridges would be connected to a common DC link.

Returning now to FIG. 5 and working from left to right in that figure, it can be seen that the alternator is connected to the power and control system such that the terminals A and B of the alternator are tied to H bridge nodes C and D via a series-connected power factor correction capacitor $C_{pfc}$ 330 and current sensor 312. As shown in the figure and as discussed above, the alternator has associated with it an internal voltage $V_{int}$ 390, an internal inductance $L_a$ and an internal resistance $R_a$. Voltage sensor 314 is provided to monitor the alternator terminal voltage $V_a$ at alternator terminals A and B. Current sensor 312 is provided to monitor the current $I_{alt}$ flowing into or out of the alternator.

The H-bridge is preferably implemented using uni-directional switches S1 335, S2 355, S3 345 and S4 as shown in FIG. 5. Each uni-directional switch consists of a single MOSFET. A detailed view of the MOSFET is provided in FIG. 6. According to a preferred embodiment of the present invention, the MOSFETs comprise International Rectifier IRFP260N devices or a similar MOSFET with voltage and current ratings suitable for accommodating the rated power of the alternator and DC link voltage favorable to cost-effective implementation and efficient operation of the other power conversion circuits connected to the DC link. These considerations are well-known in the art.

Insulated gate bipolar transistors (IGBTs) may alternatively be used to implement the H bridge switches and may be preferred for higher power applications (e.g., 25 kW) as they may offer lower conduction loss than MOSFETs of suitable voltage, current and power ratings. Moreover, at very high power levels (e.g., 100 kW), MOSFETs of suitable voltage, current and power ratings may not be available. However, as the IGBT device does not provide the intrinsic reverse diode function of the MOSFET, external diode devices must be installed in shunt across each IGBT device with the diode cathode connected to the IGBT collector terminal and the diode anode connected to the IGBT emitter terminal.

Similarly, any other switching device which can provide like functionality of the MOSFET or IGBT switch and intrinsic or separate reverse diode as well as support pulse width modulation operation at a carrier frequency on the order of 5 kHz or more can be employed—including devices which may inherently provide bi-directional conduction and blocking. By way of example, in an alternate embodiment, H bridge switches may be bi-directional and comprised of two MOSFETs connected back to back at their source terminals. For purposes of the remaining discussion use of a single, unidirectional MOSFET device as shown in FIG. 6 will be assumed.

The H-bridge formed by the uni-directional switches selectively permits current to flow either into or out of the alternator depending upon the particular switch connection configuration and the alternator internal and terminal voltage amplitudes. Oscillation of the FPSE/LA system will automatically synchronize to the SPC and hence the frequency of the alternator internal voltage and that at its terminals is always the same.

As can be seen from FIG. 5, switches S1 335 and S4 365 are paired such that these switches are either both "ON" or both "OFF". The same thing is true of the S2 355 and S3 345 switch pair. The conduction duty cycle of switch pair S1–S4 and switch pair S2–S3 is controlled by pulse width modulation (PWM) means well known in the art such that the effective voltage waveform developed at the alternator terminals is a sinusoid of controllable frequency and amplitude. To achieve an effective sinusoidal voltage of acceptable fidelity, the PWM switching or carrier frequency has a minimum value on the order of 30 times the highest fundamental frequency of the alternator terminal voltage. In this regard it is desired to use the lowest PWM carrier frequency providing adequate voltage waveform fidelity in order that the MOSFET switching losses are minimized. It should be noted that the inductance of the alternator will suppress the flow of current components which might otherwise be driven by harmonic components of the non-ideal sinusoidal voltage synthesized by PWM. As alternator current rather than terminal voltage distortion will be have a greater impact on FPSE/LA performance, in particular vibration and losses, the moderate degree of alternator terminal voltage distortion may be acceptable with the benefit of permitting a low carrier frequency and consequent MOSFET switching losses.

As well known in the art, the effective amplitude of the synthesized alternator terminal voltage is instantaneously controlled by the PWM duty cycle. To achieve a nominal sinusoidal waveform, the duty cycle is varied according to a sinusoidal modulation command template at the desired terminal voltage frequency. Additionally, to control the amplitude of the synthesized effective alternator voltage, the sinusoidal command template may be scaled up or down as required. The PWM signal required to control the H bridge switches in the fashion which will produce the desired effective sinusoidal alternator terminal voltage may be produced by several means well known in the art.

One such means is the "sine-triangle" method wherein a sinusoidal template signal at the desired frequency of the alternator terminal voltage, and suitably scaled to produce the desired alternator terminal voltage amplitude, is compared with a triangular waveform at the PWM carrier frequency. When the amplitude of the triangular carrier wave exceeds that of the template, the binary PWM signal state is switched (e.g., from gate drive ON to gate drive OFF). When the triangular carrier wave amplitude returns below that of the template, the PWM signal state is switched to the previous state (e.g., from gate drive OFF to gate drive ON).

Alternatively, the requisite PWM signal states may be determined by purpose-designed counter-comparator digital circuits formed as an integral part of a digital signal processor (DSP) device 400. The counter-comparator is effectively a DSP peripheral and its operating parameters can be configured by the state of control register bit states. The control register configuration may be established by an initialization subroutine which is part of the DSP firmware resident in non-volatile program memory which may also be an integral part of the DSP chip 400. In a preferred embodiment using a TI TMS320LF2406A DSP, or a DSP device of similar functional capability, the initialization subroutine configures counter timer control registers for production of H bridge switch PWM control signals with a preferred carrier frequency (e.g., 2.5 kHz). In particular, the counter-comparator is preferably configured to operate as an UP/DOWN counter with period equal to that of the PWM carrier frequency. A further aspect of the initialization configuration may include an interrupt generated at the end of each PWM carrier cycle. The interrupt service routine (ISR) thus activated at the end of each PWM carrier cycle would compute the required duty cycle for the next PWM period.

A portion of the ISR generates a sinusoidal template of frequency determined by a frequency set point command 410 received from the engine control system (ECS). ECS functions may be implemented by a DSP or microcomputer unit separate from the SPC in which case the frequency set point command may be communicated to the SPC DSP in analog form and read by one of sixteen analog to digital converter (ADC) channels provided by mixed (analog and digital) circuits which are also integrated within the DSP chip 400. Alternatively the separately implemented ECS may communicate the frequency set point command to the SPC DSP through either a serial or parallel digital link. Where ECS functions are implemented by the same DSP which controls the SPC, the frequency set point command is communicated through digital means within the DSP program.

The amplitude of the template is determined by the alternator terminal voltage required to achieve the piston displacement commanded by the ECS. As in the case of the frequency set point command, the piston displacement set point command may be generated by a separate ECS DSP or microcomputer and communicated to the SPC DSP via analog or digital means. Where ECS and SPC functions are implemented by a common DSP, the piston displacement set point is communicated by digital means within the DSP program. In a preferred embodiment, the required voltage amplitude is determined by comparing the current piston position as indicated by a piston position sensor (signal 445) with the commanded piston displacement 420. The piston position sensor signal 445 is read by a third ADC channel.

The portion of the ISR responsible for calculation of the next PWM duty cycle may operate by executing the following steps:

1. Read the current value of the alternator voltage frequency command;
2. Use the frequency command value to update the period of an UP counter generating a monotonically increasing value which resets to zero at the end of the period;
3. Take the current counter value as indicative of a normalized angle in the range of −1 to 1 representing −180 to 180 degrees of sinusoid phase and calculate a polynomial approximation of the sine of this angle;
4. Read the current ECS piston displacement command;
5. Use the current piston position indication provided by a piston position sensor to update the current estimate of the most recent peak piston displacement;
6. Compare the most recent estimate of peak piston displacement with the commanded piston displacement and apply the resulting error signal to a control system computation to update the estimated amplitude of the alternator terminal voltage required to minimize the error. For this purpose, the control system computation may implement a proportional-integral (PI) or proportional-integral-derivative (PID) control procedure;
7. Use a normalized value of the terminal voltage amplitude just computed to scale the sine value calculated in step 3; and
8. Use this scaled sine template value to establish the duty cycle of the next PWM period.

The current value of the previously described UP/DOWN counter and the current scaled sine template value are compared by the digital comparator. When the counter value exceeds the template value, the associated PWM output signal state is changed (e.g., from gate drive ON to OFF). When the counter value falls below the template value, the PWM output signal state is restored to the previous condition (e.g., from gate drive OFF to ON). The use of an UP/DOWN counter provides a so-called symmetrical PWM wave which is known to reduce the harmonic content of the synthesized effective sinusoidal alternator terminal voltage. An alternative procedure which can be implemented with the same DSP counter-comparator peripheral employs a UP counter resulting in a less desirable asymmetric PWM wave.

The DSP counter-comparator peripheral circuit also preferably includes means to assure that in making the transition from S1 and S4 ON to S2 and S3 ON that S1 and S2 or S3 and S4 are not ON simultaneously. This is accomplished by insertion of short (e.g., 2 microsecond) "dead" or "blanking" time" intervals in the gate control signals during which all switches are in the OFF state—a practice well-known in the art.

Absent this protection, simultaneous conduction of S1 and S2 or S3 and S4 would result in a "shoot through" condition wherein the DC link voltage could drive a relatively unlimited current though these switches and almost certainly cause them to fail. Note that the gate driver circuit, described below, may also provide dead or blanking time intervals. Either DSP 400, gate driver or both may be used to protect against shoot through hazards.

FIGS. 7(a) and 7(b) are graphs generated using SPICE simulation software with respect to the applied PWM waveforms and the resulting internal alternator terminal voltage. FIG. 7(a) illustrates high 710 and low 720 side PWM waveforms, which when employed to control the H bridge switches, will generate an effective alternator terminal voltage. Waveform 730 represents the generated sinusoidal template used to control duty cycle. FIG. 7(b) illustrates the resulting internal alternator terminal voltage waveform 740. Low pass filtering is used to demonstrate the effective sinusoidal value as represented by waveform 750 which is compared against the applied sinusoidal template waveform 730. Note that the small sinusoidal ripple on the PWM voltage waveform 740 is due to fluctuation of the voltage on DC link 302. This ripple can be suppressed by increasing the size of the DC link capacitor 398 or by voltage regulation provided by battery 315 via communication between buck/boost converter 316 and DC link 302. A modest amount of ripple amplitude (e.g., 5 to 10% peak-peak) may be acceptable.

As described above, the SPC will control peak piston displacement according to an ECS commanded set point value by adjustment of alternator terminal voltage amplitude. However, the DSP firmware also compares the near-instantaneous piston position (e.g., derived from a moving average of the most recent 4 ADC samples of the piston position sensor output) with a safe operating piston displacement threshold. A detected violation of this threshold, which might arise due to a transient or unrecoverable malfunction, initiates immediate reduction of alternator terminal voltage amplitude and/or a simultaneous reduction of voltage frequency as well as a coordinated turn down of the engine combustion system. DSP firmware features may be provided to either shutdown FPSE/LA operation or attempt recovery of operation from a transient malfunction condition in which case a repeat piston excursion violation would then shut down the FPSE/LA system.

As just described, a preferred embodiment of the power and control system 300 also comprises a digital signal processor (DSP) device 400 which, in a preferred embodiment, is the TMS320LF2406A manufactured and available from Texas Instruments Incorporated or another DSP device of similar capabilities. While the DSP typically provides most of the required functionality, auxiliary integrated circuits and other electronic components may be included to filter, buffer or otherwise condition signals which ultimately are interfaced to the DSP input and output ports.

DSP controller 400 includes various analog and binary inputs and outputs which are used to provide an interface between DSP 400, alternator current and voltage sensors 312 and 314 respectively, an engine control system (not shown) and various other components included within power and control system 300. Inputs 410 and 420 to DSP 400 are operating frequency and piston displacement setpoint commands inputs, respectively, generated by the engine control system (ECS). ECS functions may be implemented by a separate DSP, "general purpose" microcomputer or the same DSP which controls the SPC. The command inputs to the DSP from the ECS are shown in FIG. 5 as analog signals but these may also be either in serial or parallel digital format. Where ECS and SPC control functions are implemented with a common DSP these commands may be firmware variables written and read by the ECS and SPC procedures respectively.

As known in the art, the ECS functions to control overall FPSE operations including control of fuel and combustion air flow rates to maintain a desired heater head temperature. The ECS is configured to deliver to the SPC the above mentioned setpoint commands for operating frequency and piston displacement which the ECS estimates will provide desired performance characteristics including, for example, the fastest warm up or optimal fuel efficiency. These setpoint commands are observed by the SPC and the frequency command setpoint is directly employed to adjust the frequency of the alternator terminal voltage. The SPC also compares the instantaneous piston displacement (directly observed with a suitable piston position sensor or inferred from the alternator internal voltage amplitude) with the piston displacement setpoint provided by the ECS and controls the amplitude of the alternator terminal voltage according to the displacement "error" obtained from this comparison to achieve the commanded value. A feedback control loop may be used for this purpose with the amplitude of the alternator terminal voltage adjusted to minimize the "proportional" error and optionally its integral and derivative. Alternative methodologies may also be employed for this purpose such as "deadbeat" control, feedforward control and fuzzy logic techniques.

So far, the SPC's response to frequency and piston displacement setpoint commands has been discussed. Additionally, the SPC reports the current alternator power output 465 and the state of charge (SOC) of the battery 455 or equivalent energy storage unit to the ECS. The ECS may use the alternator power indication as a feedforward input to the combustion system in order to provide more effective control of the heater head temperature. The power feedforward signal 465 provides "advance notice" of a need for additional or reduced heat input to meet a change in alternator load conditions which anticipates a pending change in heater head temperature due to this new load condition.

The SPC also provides the ECS with an indication of battery state of charge which may be used by the ECS to determine the optimal FPSE/LA power level for purposes of maintaining sufficient stored energy to meet a sudden power demand increase while leaving adequate "storage headroom" to absorb a sudden demand decrease. DSP outputs 465 and 455 provide these indications to the ECS. While these outputs are identified in FIG. 5 as analog signals they may also be either in serial or parallel digital format. Where ECS and SPC control functionality are implemented with a common DSP, these alternator power and battery SOC indications may be firmware variables written and read by SPC and ECS procedures respectively.

State of charge of battery 315 may be determined via DSP 400 according to various methods as is known in the art. In a preferred embodiment, which may, for example, involve the use of a VRLA (valve regulated lead acid) battery as battery 315, state of charge may be determined in a "coulomb counting" fashion as follows. At initial power up, state of charge may be determined by observing unloaded voltage normalized to volts per cell. Once running and after a load has been placed on the system, deviation from the initial state of charge, first determined by observation of the unloaded battery voltage, may be calculated by integrating the current flow into and out of the battery and normalizing the integral value by the rated ampere-hour capacity of the battery 315.

Additional inputs to DSP 400 include input 430 which represents the alternator terminal voltage $V_a$ and the current flowing in or out of the alternator which is provided to DSP 400 through input 440. Additionally the preferred embodiment includes input 445 for one or more piston position sensors where such devices are employed to monitor the piston displacement. Even with a multiple piston FPSE, one piston displacement sensor may suffice as piston displacements can be expected to be nominally equal in a well designed and manufactured unit. Alternatively, it may be possible to infer piston position from the alternator terminal voltage 314 by making suitable calculations to derive the internal voltage by subtracting voltage drops across the internal resistance and inductance elements. Adjustment may also be required to compensate for uncertainty in the magnetic field strength of the mover which may vary with time and temperature.

A set of two pulse width modulated (PWM) outputs 450 and 460 are made available by DSP 400. These signals are used to control switch pairs S1/S3 and S2/S4 respectively.

Although not shown in FIG. 5, buffering circuits which implement "high side" and "low side" gate driver circuits are preferably interposed between PWM outputs 450 and 460 of DSP 400 and the and the MOSFET gate connections. These buffer elements may be, for example, high voltage application specific integrated circuits (ASICs) such as the IR2110 manufactured and marketed by International Rectifier, Inc. In this way, the 3.3V output signals from DSP 400 can be converted to 15V gate drive signals suitable for controlling the H-bridge MOSFET switches. In particular, the high side drivers employed to operate high side switches S1 335 and S3 345 must be designed to decouple the DSP PWM command outputs from the high common mode potential of these gates. This capability is implemented by the illustrative IR2110 gate driver device.

Continuing to work towards the right in FIG. 5, various other components including battery 315 for storing and providing electrical energy are included. High side MOSFET (with intrinsic diode) switch 375 and low side MOSFET (with intrinsic diode) switch 385 (both of which may also, for example, be an International Rectifier IRFP260N as discussed above with respect to the switches) are used to control battery charging and battery discharging functions as described below. As in the case of the H-bridge previously described, any switching device providing the functionality of the MOSFET and its intrinsic reverse diode and which can support pulse width modulation operation at a carrier frequency on the order of 5 kHz or greater may be used to implement high and low side switches 375 and 385 respectively. These switches need provide only uni-directional conduction and blocking control. However, a reverse diode must be provided for each. The intrinsic reverse diode of the MOSFET device provides this function but in the case of an IGBT separate reverse diodes must be provided with diode anode connected to IGBT emitter and diode cathode connected to IGBT collector. Analog input 470 to DSP 400 represents the voltage across DC link positive terminal 302 and DC link negative terminal 304. Analog input 480 to DSP 400 represents the current, $I_{bat}$ flowing into or out of battery 315 as sensed by a current sensor. Analog input 415 to DSP 400 represents the voltage, $V_{bat}$, across the terminals of battery 315.

PWM output 490 from DSP 400 provides control of MOSFET Q5 in connection with battery charging and discharging operations. Similarly, PWM output 425 from DSP 400 provides control of MOSFET Q6 during battery charging and discharging operations. PWM output signals 490 and 425 are buffered via high side and low side gate driver functions as described above with respect to other outputs of DSP 400. Finally, as previously described, DSP 400 preferably includes two analog outputs 455 and 465 which are fed to the engine control system. In a preferred embodiment, output signal 455 provides alternator power feedforward data to the engine control system in order to specify anticipated future engine thermal power requirements. Additionally, output signal 465 provides battery state of charge data to the engine control system to permit engine control system to optimize engine operation using data concerning current battery storage level. As previously noted, these SPC DSP outputs which report to the ECS may also be in the form of serial or parallel formatted digital signals. If ECS and SPC control functionality is implemented with a common DSP, these parameters may be program variables respectively written and read by ECS and SPC firmware procedures.

Now that an overview of the circuit and related components of the present invention according to one embodiment thereof has been presented, the following discussion covers the process for charging and discharging battery 315 within power and control system 300. It may be desirable, for instance, to charge battery 315 if its storage level is low in preparation for future engine power requirements or to transiently maintain alternator loading immediately after an abrupt interruption of external load. Alternatively, it may be desirable to discharge battery 315 to transiently augment available FPSE power in case, for example, a load increase is suddenly connected to the FPSE/LA power plant. The addition of power from battery 315 may be provided for a limited time to address the increased load and until additional heat can be supplied to the engine to support the additional load.

In order to charge battery 315, the following procedure is initiated. Normally MOSFET switches Q5 375 and Q6 385 are in the OFF/non-conducting state. Further diodes D5 and D6 are poled so that no current can flow from DC link positive rail 302 to DC link negative rail 304 in the base operating condition. To initiate a charging operation, DSP 400 provides a PWM signal via output 490 to transistor Q5, such signal having a momentary MOSFET gate drive pulse resulting in a corresponding time during which current may flow from the positive DC link rail 302 through MOSFET switch Q5. This action pulls the inductor $L_{buck/boost}$ 316 lead at node E up to the voltage at rail 302 and as a result, current in the inductor and battery 315 will begin to ramp up. Ramping will occur at a ramp rate of V/L where V is the voltage across the inductor and L is the inductance of the inductor. Ramp rate is thus constant over time. At the point that the positive pulse from output 490 ends, Q5 375 becomes non-conducting, although current continues to flow and free-wheel through MOSFET intrinsic diode D6 385.

As a result, a current loop is formed temporarily. This loop comprises flow through the inductor, through $I_{bat}$ current sensor 318 and into a terminal of battery 315 and then up the anode of diode D6, through the diode, out the cathode of D6 and then into the right hand terminal of the inductor 316. A decay of flowing current occurs and then a new pulse is provided to provide additional battery charging. Pulses are provided at a fixed PWM carrier frequency rate (e.g., 5 kHz) and according to the duty cycle of the pulses, battery 315 can be charged to a desired level. According to a preferred embodiment, the duty cycle of the pulses applied to Q5 375 are controlled by DSP implemented outer and inner voltage and current proportional and integral (PI) controllers. The outer loop PI controller observes the DC link voltage via sensor 326 and then compares this value with a fixed set point value and calculates proportional and integral terms which are combined to form a voltage controller output which serves as the set point for the inner current loop PI controller. The inner current loop PI controller compares battery current observed by current sensor 318 with the current commanded by the outer loop voltage controller and calculates proportional and integral terms which are combined to form a control output which determines the PWM duty cycle for the buck switch Q5 375. This nested outer voltage and inner current loop configuration is adopted to provide favorable dynamic control characteristics—e.g., stable operation with fast response and minimal overshoot while at the same time affording a means to limit battery current to a safe value.

Charging mode is terminated when a rise of DC link voltage due to abrupt interruption of external load is suppressed. The duration of battery charging initiated to transiently maintain alternator loading after an abrupt reduction of external load is limited by a simultaneous reduction of engine heat flux input by the ECS initiated by an abrupt drop of the alternator power feedforward indication.

Other charging policies may also be adopted (e.g., charging at constant battery terminal voltage until battery current falls below a threshold value indicating an upper state of charge condition). In this case, the DSP implemented charging controller would regulate battery terminal voltage reported by sensor 320 while monitoring battery current observed by battery current sensor 318. DSP firmware methodologies for generation of the PWM signal for control of MOSFET switch Q5 375 are similar to those previously described for the H bridge switches.

Battery discharging is accomplished through the following process. A pulse train is supplied at output 425 of DSP 400 to the gate of MOSFET Q6 385. When Q6 385 is gated ON by this pulse it becomes conducting and battery 315 is short circuited by inductor 316. In this case, current then flows in a clockwise loop and ramps up as before at a ramp rate of V/L. In this case, however, V is essentially the voltage across the terminals of battery 315. Ramp up is accomplished and then Q6 385 is opened at the conclusion of the gate turn ON pulse emanating from output 425 of DSP 400. At this point, the current out of the inductor freewheels up through MOSFET intrinsic diode D5 and charges DC link capacitor 398.

Following an incremental discharge of the DC link capacitor(s) a new gate turn ON pulse is applied to MOSFET Q6 385 to continue discharge of battery 315 for the purpose of supporting the DC link voltage in a desired range. According to a preferred embodiment, the duty cycle of the pulses applied to Q6 385 are controlled by DSP implemented outer and inner voltage and current proportional and integral (PI) controllers. The outer loop PI controller observes the DC link voltage via sensor 326, compares this value with a fixed set point value and calculates proportional and integral terms which are combined to form a voltage controller output which serves as the set point for the inner current loop PI controller. The inner current loop PI controller compares battery current observed by current sensor 318 with the current commanded by the outer loop voltage controller and calculates proportional and integral terms which are combined to form a control output which determines the PWM duty cycle for the boost switch Q6 385. This nested outer voltage and inner current loop configuration is adopted to provide favorable dynamic control characteristics such as stable operation with fast response and minimal overshoot while at the same time affording a means to limit battery current to a safe value.

As discussed in detail above, in a preferred embodiment of the present invention, various SPC control signals are received and generated by DSP 400. The characteristics of these signals are largely discussed above. The following discussion provides additional details concerning the programming of DSP 400 as well as other related aspects associated with the overall control of the SPC of the present invention in a preferred embodiment thereof.

With respect to the input signals provided to DSP 400 including for example, battery current 480, DC link voltage 470 and piston position 445, DSP ADC channels typically accept only unipolar signals so that, as a result, bipolar inputs must be provided with a bias. This may be done via any of a variety of methods as is well known in the art.

In the SPC of the present invention, it is necessary to PWM synthesize a grid voltage (frequency and amplitude controlled) which is applied at the terminals of the alternator and power factor correction capacitor. This, in turn, requires the use of a sine wave reference signal which is generated by DSP 400. Again, any of various methods as is known in the art may be used for this purpose, including, for example, a table lookup methodology or a real-time computational methodology. In a preferred embodiment, grid voltage amplitude is controlled according to a piston stroke command passed by the DSP engine control routine (PID or PI controller output) to achieve the desired piston stroke.

A piston displacement control methodology using integral feedback via a PI controller is employed in the preferred embodiment of the present invention in order to obtain stable operation with acceptable dynamic performance in terms of control bandwidth or equivalently acceptable step change response time and overshoot. To achieve acceptable dynamic performance the use of proportional and integral terms is preferred but a derivative term may or may not be required. In either case (i.e., PI or PID controllers), instantaneous piston position is observed and a displacement metric is calculated from these values by the DSP. The displacement metric may be either peak value displacement, RMS displacement, or an average of the rectified position sine wave. According to the present invention, the last option is the preferred embodiment although the invention, as would be apparent to one of skill in the art, is not necessarily limited thereto. Either RMS or an average of rectified position sine wave calculations preferably employs the use of coherent averages calculated over the period of one cycle to provide the most current estimates with minimum lag. Coherent averaging is facilitated by the fact that the period of engine-alternator oscillation is known since it is determined by the frequency of the alternator terminal voltage synthesized under DSP control.

The displacement, characterized by one of the metrics just described, is continuously compared with the displacement set point command provided by the ECS and the difference (error) is applied to calculate proportional, integral and optionally derivative terms which are aggregated as a single control output. This control output is used to adjust the amplitude of the sinusoidal template to effect an increase or decrease of alternator terminal voltage amplitude required to achieve the commanded piston displacement.

DSP 400 is also responsible for maintaining a proper voltage on the DC link. According to a preferred embodiment, if the voltage is too high, the link is loaded with battery 315 via the buck converter. If the voltage is too low, the link is supported with battery 315 via the boost converter. If the battery state of charge is determined to be out of bounds to make the preceding actions unavailable, shutdown may in some cases be commenced.

Battery 315 state of charge is also preferably maintained by a DSP 400 control algorithm. In a preferred embodiment, if state of charge is too high but within a predetermined bounds limit, the gain of the state of charge feedforward to the engine controller is incremented. Alternatively, if the state of charge is too low but within bounds, the gain of the SOC feedforward to the engine controller is decremented.

DSP 400 is also responsible for other functions such as fault supervision including monitoring for fault conditions such as over or under voltage conditions or over current conditions. DSP 400 is preferably also programmed to cause diagnostic LED or other fault indicators to illuminate in the event of fault conditions.

A control system and signal processing methodology for controlling a Stirling engine has been disclosed. It will be understood that the teachings provided above have a great many applications particularly to those associated with the control of reciprocating members in general. Although the invention has been disclosed in connection with an FPSE driving a linear alternator, the invention is not necessarily restricted thereto. For example, the teachings herein may be applied to an FPSE driving other devices such as transducers including various electromagnetic transducers including but not limited to alternators and other devices.

While the subject invention has been illustrated and described in detail in the drawings and foregoing description, the disclosed embodiments are illustrative and not restrictive in character. All changes and modifications that come within the scope of the invention are desired to be protected.

What is claimed is:

1. A control system for a free piston Stirling engine said free piston Stirling engine having a power piston, said control system comprising:
   an electromagnetic transducer in mechanical communication with the power piston, the electromagnetic transducer having an electrical port through which power is communicated;
   a piston position sensor connectable to the power piston and having a piston position output signal; and
   a controllable oscillatory power system having a bi-directional power port in electrical communication with the port of the electromagnetic transducer, and having an input control port receiving the piston position output signal, the system constructed and arranged to enforce a prescribed amplitude and prescribed frequency of the voltage at the electromagnetic transducer electrical port without constraining a current though the port so as to produce a desired reaction force on the power piston.

2. The control system of claim 1, wherein said control system further comprises signal processing circuits responsive to the input receiving the piston position output signal to enforce the prescribed frequency and voltage at the terminals of the electromagnetis transducer to control the range of travel of said power piston.

3. The control system of claim 1, wherein said free piston Stirling engine further comprises a displacer and said control system further comprises signal processing circuits that compares the input receiving the piston position output signal with a reference value and according to the difference in these values adjusts the amplitude and frequency of the voltage enforced at the terminals of the electromagnetic transducer to control the range of travel of said power piston which alters the engine dynamic pressure and thereby also controls the range of travel of said displacer.

4. The control system of claim 1, further comprising a storage device capable of storing the energy received from said electromagnetic transducer.

5. The control system of claim 4, wherein said storage device is a battery.

6. The control system of claim 4, wherein said storage device is a flywheel.

7. The control system of claim 4, wherein said storage device is a capacitor.

8. The control system of claim 1, further comprising a bi-directional power converter which generates a voltage that is selectively controlled both with respect to frequency and amplitude.

9. The control system of claim 8, the bi-directional power converter further comprising a uni-directional power supply and connected in parallel across the uni-directional power supply, a ballast load.

10. The control system of claim 9, wherein said power supply maintains an oscillating voltage of controllable frequency and amplitude across said ballast load.

11. The control system of claim 1, wherein said electromagnetic transducer is a linear alternator.

12. The control system of claim 1, wherein the excursion range of said power piston is controlled by varying the voltage amplitude across the terminals of said electromagnetic transducer.

13. The control system of claim 1, wherein the excursion range of said power piston is controlled by varying the voltage waveform frequency across the terminals of said electromagnetic transducer.

14. The control system of claim 1, wherein the bi-directional power port is an H-bridge switch set, and wherein the terminals of said electromagnetic transducer are in electrical connection with the H-bridge switch set.

15. The control system of claim 14, further comprising a digital signal processor for controlling said H-bridge switch set to selectively control voltage amplitude and voltage frequency across the terminals of said electromagnetic transducer.

16. The control system of claim 15, wherein said digital signal processor further controls the charging and discharging of a storage device capable of storing electrical energy.

17. A free piston Stirling engine driven electrical power plant, comprising:
   a power piston;
   an electromagnetic transducer in mechanical communication with the power piston, the electromagnetic transducer having an electrical port through which power is communicated;
   a piston position sensor having a piston position output signal; and
   a controllable oscillatory power system having a bi-directional power port in electrical communication with the port of the electromagnetic transducer, and having an input receiving the piston position output signal, the system constructed and arranged to enforce a prescribed amplitude and prescribed frequency of the voltage at the electromagnetic transducer electrical port without constraining a current through the port so as to produce a desired reaction force on the power piston.

18. The engine driven electrical power plant of claim 17, wherein said electromagnetic transducer is a linear alternator.

19. The engine driven electrical power plant of claim 17, wherein said controllable oscillatory power system is operable to control the range of travel of said power piston.

20. The engine driven electrical power plant of claim 17, wherein said controllable oscillatory power system further comprises a storage device capable of storing the power received from said electromagnetic transducer.

21. The engine driven electrical power plant of claim 20, wherein said storage device is a battery.

22. The engine driven electrical power plant of claim 20, wherein said storage device is a flywheel.

23. The engine driven electrical power plant of claim 20, wherein said storage device is a capacitor.

24. The engine driven electrical power plant of claim 17, wherein said controllable oscillatory power system further comprises a bi-directional power converter that generates a voltage that is selectively controlled both with respect to frequency and amplitude.

25. The engine of claim 24, wherein the bi-directional power converter further comprises a uni-directional power supply and connected in a parallel across the uni-directional power supply, a ballast load.

26. The engine of claim 25, wherein said power supply maintains an oscillating voltage of controllable frequency and amplitude across said ballast load.

27. The engine of claim 17, wherein the excursion range of said power piston is controlled by varying the amplitude of the voltage across the terminals of said electromagnetic transducer.

28. The engine of claim 17, wherein the excursion range of said power piston is controlled by varying the frequency of the voltage waveform across the terminals of said electromagnetic transducer.

29. The engine of claim 17, wherein the bi-directional power port is an H-bridge switch set, and wherein the terminals of said electromagnetic transducer are in electrical connection with the H-bridge switch set.

30. The engine of claim 29, further comprising a digital signal processor for controlling said H-bridge switch set to selectively control voltage amplitude and voltage frequency across the terminals of said electromagnetic transducer.

31. The engine of claim 30, wherein said digital signal processor further controls the charging and discharging of a storage device capable of storing electrical energy.

32. A method of controlling a free piston Stirling engine having a power piston driving an electromagnetic transducer having a port through which power is communicated, comprising
selecting an optimum engine oscillatory frequency and piston displacement;
measuring actual piston displacement; and
b) employing an oscillatory power system having a bi-directional power port to constrain said power piston to operate at the selected frequency and displacement by enforcing the amplitude and frequency of a voltage at the port of said electromagnetic transducer without constraining a current flowing through the port.

33. The method of claim 32, wherein said electromagnetic transducer comprises a linear alternator.

34. The method of claim 32, wherein the bi-directional power port is an H-bridge switch set, and wherein the terminals of said electromagnetic transducer are in electrical connection with the H-bridge switch set.

35. The method of claim 34, further comprising a digital signal processor for controlling said H-bridge switch set to selectively control voltage amplitude and voltage frequency across the terminals of said electromagnetic transducer.

36. A control method for a controlled free piston Stirling engine having a power piston driving an electromagnetic transducer having an output through which power is communicated comprising the steps of:
enforcing the power piston oscillating frequency by employing an oscillatory power system having a bi-directional power port to enforce a frequency of a voltage at the output of the electromagnetic transducer;
measuring said power piston displacement; and
adjusting an amplitude of the output voltage enforced by the oscillatory power system without constraining a current flowing through the output, so to establish a desired power piston displacement.

37. The method of claim 36, wherein said electromagnetic transducer comprises a linear alternator.

38. The method of claim 36, wherein the bi-directional power port is an H-bridge switch set, and wherein the terminals of said electromagnetic transducer are in electrical connection with the H-bridge switch set.

39. The method of claim 38, further comprising a digital signal processor for controlling said H-bridge switch set to selectively control voltage amplitude and voltage frequency across the terminals of said electromagnetic transducer.

* * * * *

UNITED STATES PATENT AND TRADEMARK OFFICE
CERTIFICATE OF CORRECTION

PATENT NO. : 7,200,994 B2
APPLICATION NO. : 10/883393
DATED : April 10, 2007
INVENTOR(S) : Allan Chertok It is certified that error appears in the above-identified patent and that said Letters Patent is hereby corrected as shown below:

On the Title Page, Item (73) "Tiax LLC" should read -- TIAX LLC --.
In column 11, line 47, "H bridge" should read -- H-bridge. --.
In column 12, line 24, "unidirectional" should read -- uni-directional --.
In column 21, line 36, "though" should read -- through --.
In column 21, line 43, "electromagnetis" should read -- electromagnetic --.
In column 23, line 6, "in a parallel" should read -- in parallel --.

Signed and Sealed this

Twenty-second Day of May, 2007

JON W. DUDAS
*Director of the United States Patent and Trademark Office*